US007082675B2

(12) United States Patent
Frölich et al.

(10) Patent No.: US 7,082,675 B2

(45) Date of Patent: Aug. 1, 2006

(54) METHOD FOR MANUFACTURING A SOLID CORE OF LAMINATIONS

(76) Inventors: Eberhard Frölich, Hirtenwiesen 37, 74343 Sachsenheim (DE); Siegfried Jauss, Nordstr. 3, 74343 Sachsenheim (DE)

( * ) Notice: Subject to any disclaimer, the term of this patent is extended or adjusted under 35 U.S.C. 154(b) by 696 days.

(21) Appl. No.: 09/899,694

(22) Filed: Jul. 5, 2001

(65) Prior Publication Data

US 2002/0003025 A1 Jan. 10, 2002

(30) Foreign Application Priority Data

Jul. 5, 2000 (DE) ........................................ 100 32 506

(51) Int. Cl.

| | |
|---|---|
| ***H01F 3/04*** | (2006.01) |
| ***H02K 15/00*** | (2006.01) |
| ***H02K 15/02*** | (2006.01) |
| ***B23P 19/00*** | (2006.01) |

(52) U.S. Cl. ............................ 29/609; 29/596; 29/598; 29/732; 29/738

(58) Field of Classification Search .................. 29/609, 29/738, 820, 596, 598, 732, 603.14; 148/101, 148/121, 122; 414/792.9, 790.2, 791.6; 156/560, 156/562; 310/156.01; 336/219, 234; 428/620, 428/692

See application file for complete search history.

(56) References Cited

U.S. PATENT DOCUMENTS

| | | | | | |
|---|---|---|---|---|---|
| 2,898,564 | A | * | 8/1959 | Terry, Jr. | 336/197 |
| 3,568,118 | A | * | 3/1971 | Kuriyama et al. | 336/185 |
| 3,875,660 | A | * | 4/1975 | Kobayashi et al. | 29/609 |
| 4,025,379 | A | * | 5/1977 | Whetstone | 29/609 |
| 4,663,604 | A | * | 5/1987 | VanSchaick et al. | 336/197 |
| 4,856,797 | A | * | 8/1989 | Rall | 279/147 |
| 5,367,931 | A | * | 11/1994 | Kitamura | 83/407 |
| 5,563,463 | A | * | 10/1996 | Stark | 310/156.28 |

FOREIGN PATENT DOCUMENTS

DE 196 29 930 2/1998

OTHER PUBLICATIONS

Patent Abstracts of Japan; JP 11045815; Publication Date Feb. 16, 1999 (drawings attached).

* cited by examiner

*Primary Examiner*—A. Dexter Tugbang
*Assistant Examiner*—Tim Phan
(74) *Attorney, Agent, or Firm*—Gudrun E. Huckett

(57) ABSTRACT

In a method for manufacturing a solid core of laminations, a sheet metal web is cut in the longitudinal direction of the sheet metal web to produce at least two sheet metal strips. The sheet metal strips are separated in a direction transverse to the longitudinal direction of the sheet metal strips to form laminations. The laminations are joined to form a solid core. Joining can be carried out by welding, riveting, gluing or pressing.

13 Claims, 5 Drawing Sheets

METHOD FOR MANUFACTURING A SOLID CORE OF LAMINATIONS

BACKGROUND OF THE INVENTION

1. Field of the Invention

The invention relates to a method for manufacturing solid cores of laminations which are cut from a sheet metal web and are combined to a solid core.

2. Description of the Related Art

It is known to stamp laminations out of a sheet metal web by means of a sequential stamping tool and to join the laminations to form a solid core. Such solid cores are used, for example, as magnet cores in the ignition systems of motor vehicles. The laminations are stamped in individual stamping steps out of the sheet metal web wherein first laminations are stamped out at a spacing to one another transverse to the longitudinal direction of the sheet metal web in a first stamping sequence. In a subsequent stamping step, further laminations are stamped out within the web areas remaining between the areas where laminations have already been stamped out. This method produces a considerable amount of scrap metal because sheet metal stays remain between the areas where the laminations have already been stamped out and these stays cannot be utilized.

SUMMARY OF THE INVENTION

It is an object of the present invention to provide a method of the aforementioned kind with which the sheet metal can be optimally utilized for cutting out the laminations for the solid core.

In accordance with the present invention, this is achieved in that the sheet metal web is cut in its longitudinal direction to form at least two sheet metal strips from which the laminations are then separated transversely to the longitudinal direction of the respective sheet metal strip.

In the method according to the invention, the sheet metal web is first cut in the longitudinal direction to form at least two sheet metal strips. From these sheet metal strips the individual laminations are then successively separated from one another in a direction transverse to the longitudinal direction. With the method according to the invention, a material utilization of 100% is thus possible.

DESCRIPTION OF THE PREFERRED EMBODIMENTS

Figure 5:
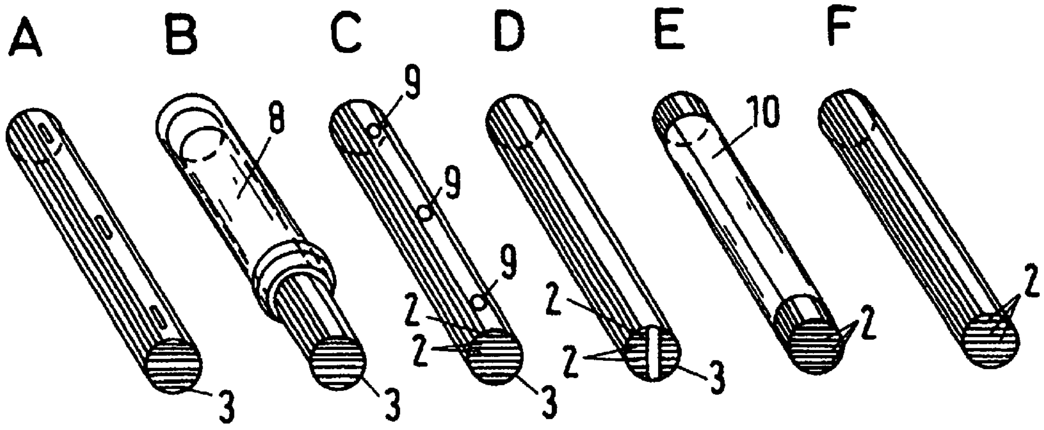
FIG. 5 shows different embodiments of the connection of the individual laminations for forming the solid core.

The method to be described in the following comprises the step of cutting from a sheet metal web 1 (FIG. 1) laminations 2 from which a solid core 3 in the form of a laminated core 3 (FIG. 5) is to be produced. It has a cylindrical shape. In order to achieve this, the individual laminations 2 have different width. The solid core 3 is used, for example, as a magnet core in the ignition system of a motor vehicle.

Figure 1:
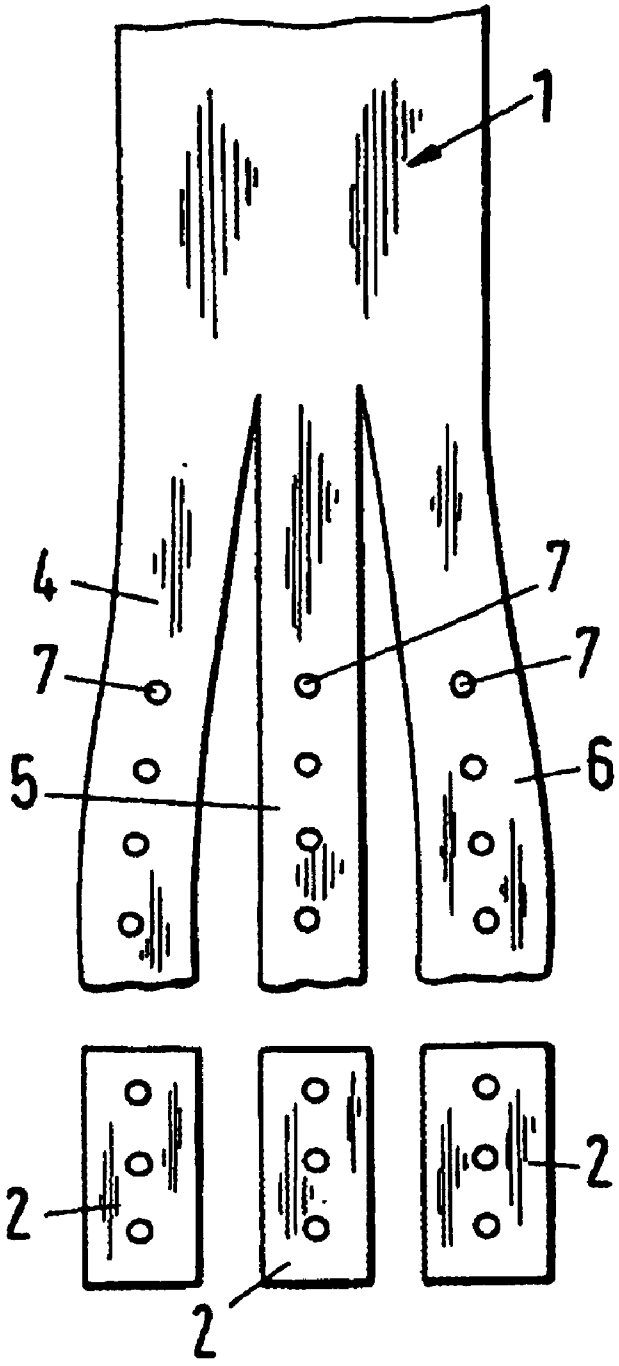
FIG. 1 is a schematic illustration of the sheet metal web while performing the method according to the invention.

For manufacturing the laminations 2, the sheet metal web 1 is first slit or cut in its longitudinal direction so that individual sheet metal strips 4–6 are formed (FIG. 1). They each have a different width for the manufacture of the cylindrical solid core. In FIG. 1, the sheet metal web 1 is separated or cut only in an exemplary fashion into three sheet metal strips 4–6. The sheet metal web 1 can also be separated into two or more than three sheet metal strips. Also, the sheet metal strips must not necessarily have different widths but can also have the same width. In this case, quadrangular solid cores are formed of the laminations 2 instead of cores having a circular cross-section. In the illustrated and described embodiment, the solid core is however of a cylindrical configuration and has a corresponding circular cross-section.

After the longitudinal separation of the sheet metal web 1 has been performed, positive-locking elements 7 are provided within the sheet metal strips 4 to 6 which are, for example, in the form of holes or wart-shaped projections. After the positive-locking elements 7 have been applied, the sheet metal strips 4–6 are separated or cut in a direction transverse to the longitudinal direction into the individual laminations 2.

As a result of these method steps, the sheet metal web 1 is utilized in an optimal way. There is almost no material waste so that an almost 100% utilization of the sheet metal web 1 can be achieved. Accordingly, the solid core 3 can be manufactured in a cost-efficient way. Constructively complex devices and tools are not required for the purpose of longitudinally slitting or cutting the sheet metal web 1 and for separating the lamellas 2 from the sheet metal strips 4–6. For slitting the sheet metal web 1 in its longitudinal direction, it is possible to employ, for example, rotating slitting blades but also bottom and upper dies. For separating the laminations 2 from the strip-shaped sheet metal 4–6, simple dies can be used.

Figure 2:
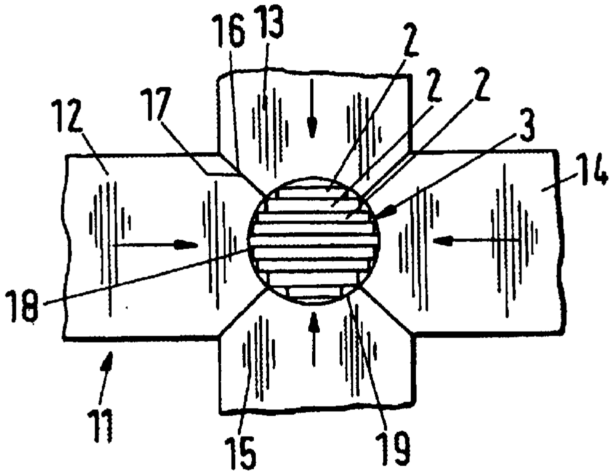
FIG. 2 shows a joining tool for manufacturing a solid core.

The laminations 2 having different width and advantageously the same length are then joined to form the solid core 3. FIG. 2 shows in a plan view the laminations 2 of different width. The cylinder shape of the solid core 3 is approximated the more the smaller the steps in the width of the laminations 2 are. By means of the positive-locking elements 7 the stacked laminations—in the embodiment the laminations are of a rectangular shape—are connected to one another. When the positive-locking elements 7 are wart-shaped projections within the laminations 2, the upper laminations 2 engages with its projections 7 the corresponding depressions at the backside of the neighboring laminations 2. The laminations 2 in this way are connected in a positive-locking way by the interlocking method. FIG. 5*a* shows a solid core 3 which has been produced by interlocking.

It is also possible to provide the laminations 2 without positive-locking elements and to insert or slide the laminations 2, which are to be combined to a solid core 3, into a tube or tubular receptacle 8 (FIG. 5*b*). The inner diameter of the tube 8 corresponds to the outer diameter of the solid core 3. The tube 8 reliably holds the laminations 2 of the solid core 3 together. The laminations 2 can be connected, for example, by gluing within the tube 8. It is also possible to close off the ends of the tube 8 after insertion of the solid core 3.

FIG. 5*c* shows the possibility of connecting the individual laminations 2 of the solid core 3 by rivets 9 which penetrate the laminations 2. In this case, laminations 2 are provided with openings for receiving the rivets 9.

The stacked laminations 2 can also be joined according to FIG. 5*d* by welding to form the solid core 3. It is possible to employ a laser welding device or a laser apparatus for welding.

The laminations 2 can also be held together by a wrap or wound envelope 10 (FIG. 5*e*).

It is moreover possible to glue the stacked laminations 2 to one another. In this case, a device for applying an adhesive or glue onto the laminations 2 is provided. Optionally, a heating device can be provided in order to accelerate the curing process of the adhesive or glue. It is also possible to use a sheet metal web 1 onto which an adhesive has already been applied which has no adhesive properties at room temperature.

In the cases in which the laminations 2 are inserted into the enveloping component 8 or are welded together or wrapped or glued together, positive-locking elements or openings in the laminations are not required. In this situation, the sheet metal web 1 must only be slitted in the longitudinal direction and the laminations must be stamped or cut out of the resulting sheet metal strips.

The lamellas 2 are joined advantageously by means of a joining tool 11 to form the solid core 3. The joining tool 11 has advantageously four tool parts 12 to 15, and each tool part is adjustable or moveable radially relative to the solid core (FIG. 2). In the joining position (final position), the four tool parts 12 to 15 contact one another areally with their slanted end faces 16, 17. Each tool part 12 to 15 has two end faces 16, 17 which are oriented at a right angle to one another between which a concave, part-circular depression 18 is positioned. When the parts 12 to 15 rest with their end faces 16, 17 against one another, the depressions 18 form a cylindrical cavity or receiving chamber 19 for the solid core 3. The laminations 2 of the solid core 3 rest with their edges extending in the axial direction of the solid core 3 against the wall of the receiving chamber 19.

Figure 3:
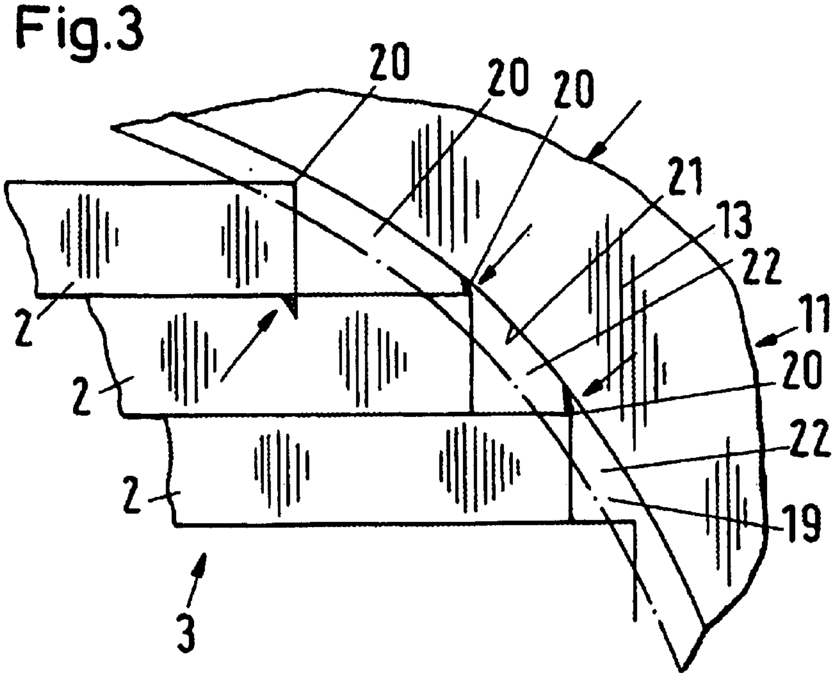
FIG. 3 is an enlarged illustration of a part of the joining tool according to FIG. 2 in its initial or starting position.
Figure 4:
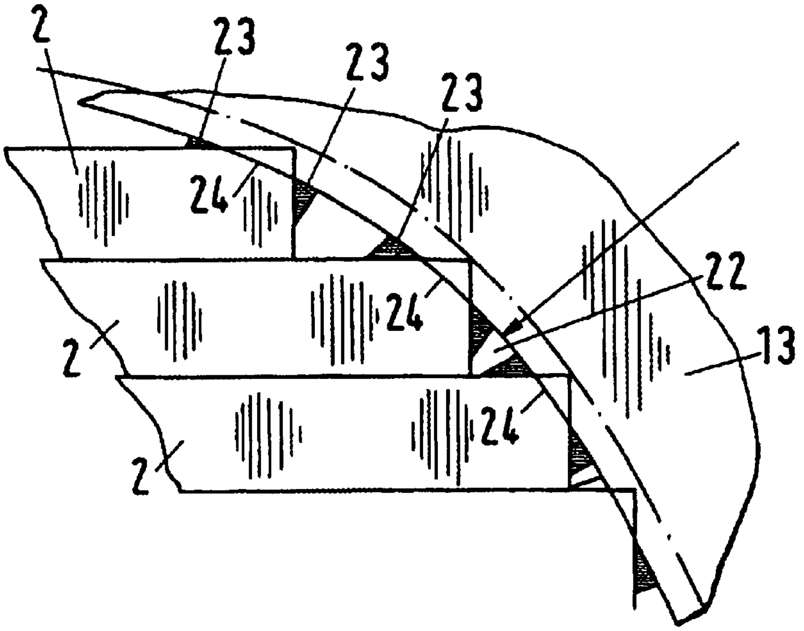
FIG. 4 shows a part of the joining tool in its final position.

Advantageously, the joining tool 11 can also be formed as a pressing or stamping pool. As is shown in FIG. 3 for such a joining tool 11, the laminations 2 of the solid core 3 rest with their axially extending longitudinal edges 20 against the wall of the receiving chamber 19 in the initial position of the tool parts 12 to 15. Between the stacked laminations 2 and the wall 21 of the receiving chamber 19, interstitial spaces 22 remain which are triangular when viewed in cross-section. The tool parts 12 to 15, which in the illustration according to FIG. 3 still have a spacing to one another, are moved radially inwardly. In this connection, the laminations 2 are plastically deformed in the edge area of the longitudinal edges 20 (FIG. 4) such that the laminations 2 in the area of the longitudinal edges 20 are flattened in that a portion of the edge area of the laminations 2 is displaced into the interstitial spaces 22. These displaced areas 23 resulting by means of plastic deformation are illustrated in FIG. 4. As a result of the deformed or displaced areas 23, the interstitial spaces 22 have been made smaller. Moreover, since the laminations 2 are flattened by the pressing process in the area of their longitudinal edges 20, the solid core 3 has an optimal cylindrical outer shape.

By adjusting the thickness of the laminations 2, it is possible to make the interstitial spaces 22 only so large that the deformed areas 23 of the laminations 2 completely fill the interstitial spaces 22. In this case, the solid core 3 has an optimal cylindrical shape even though it is formed of rectangular sheet metal laminations 2.

In FIG. 3, the solid line shows the inner wall 21 of the tool parts 12 to 15 in the initial or starting position and the dash-dotted line shows the position after the pressing step. After pressing, the laminations 2 are provided with surfaces 24 instead of the longitudinal edges 20. These surfaces 24 are curved and are positioned on the mantle surface of the finished solid core 3. As a result of the described pressing step, the filling volume of the solid core, relative to the circular cross-section, is increased in comparison to the solid core 3 which has not been pressed. Moreover, the burrs (longitudinal edges 20) are removed. As a result of the increase of the filling volume, the solid core 3 has excellent electrical properties.

Figure 6:
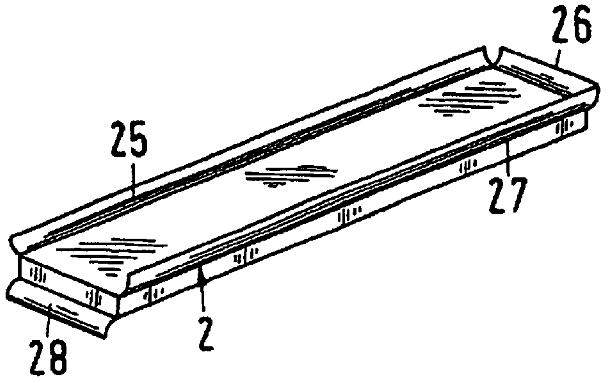
FIG. 6 is an enlarged illustration of a lamination for manufacturing the solid core.

FIG. 6 shows in an enlarged illustration one of the laminations 2. The burrs 25 to 28 which are present at the edges of the lamination as a result of the cutting step, are illustrated on an enlarged scale. The burrs 25, 27 provided at the two longitudinal sides as well as the burr 26 provided at the narrow side project in the same direction from the lamination 2. The burr 28 positioned opposite the narrow side of the lamination 2 is arranged with opposite orientation relative to the other burrs 25 to 27.

Figure 7:
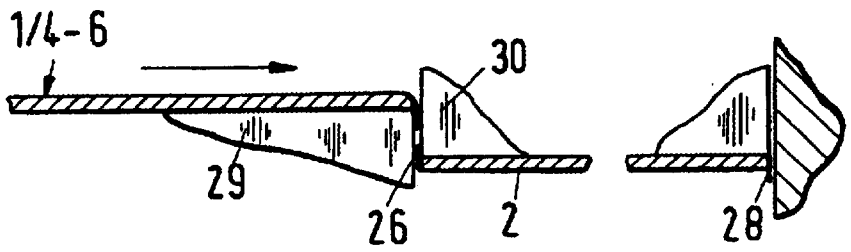
FIG. 7 shows in an enlarged illustration and in section a die for cutting the laminations according to FIG. 6 from the sheet metal strip.

FIG. 7 shows in cross-section the sheet metal web 1, respectively, one of its sheet metal strips 4 to 6. In the area of the bottom die 29, the lamination 2 is separated transversely to the longitudinal direction of the corresponding sheet metal web by means of an upper die 30. The alternating stamping burr direction illustrated in FIG. 6 results from this cutting process.

Figure 8:
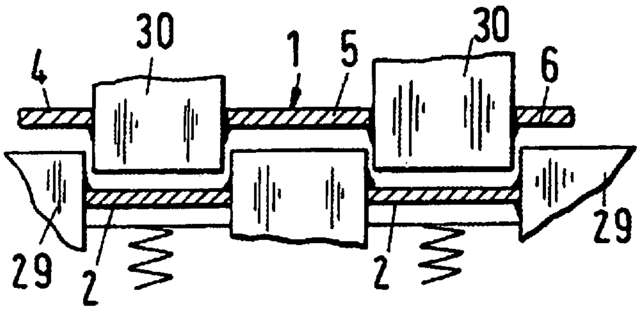
FIG. 8 shows a second embodiment of a die for separating laminations from the sheet metal strip.

FIG. 8 shows the possibility of separating the laminations 2 out of the sheet metal web 1 in the longitudinal web direction by means of dies 30. The upper die 30 is lowered into the sheet metal web 1 between two neighboring bottom dies 29. The laminations 2 are stamped or cut such that their burrs extent in the same direction. The laminations 2 are supported during the separating process in a springy way.

Figure 9:
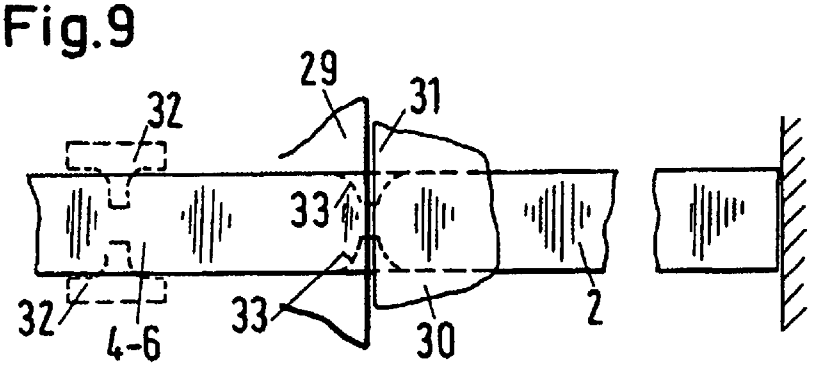
FIG. 9 is a schematic illustration in a plan view of the bottom die and the upper die according to FIG. 7 with which the laminations are separated from the sheet metal strip.

FIG. 9 shows the position of the bottom die 29 and the upper die 30. The cutting edge 31 of the upper die extends straight and perpendicularly to the longitudinal direction of the sheet metal strip 4 to 6. The lamination 2 separated from the sheet metal strip thus has a straight narrow side. The laminations used for the solid core 3 thus have, viewed in a plan view, a rectangular shape. In particular, the corners of the laminations 2 can be square (not round, i.e., have no radius of curvature) as a result of this manufacturing step.

When in the corner area of the laminations 2 radii of curvature or other profilings are desired, a corresponding tool with a correspondingly configured bottom die 29 and upper die 30 can be used. In FIG. 9, the dashed line shows two stamping tools 32 with which profilings 33 are provided on the longitudinal edges of the respective sheet metal strips 4 to 6. These profilings are spaced from one another. With the die 30 the sheet metal strips 4 to 6 are cut transversely to the longitudinal strip direction in the area of the profilings 33 for forming the laminations 2. Accordingly, the laminations 2, at least at one end thereof, preferably at both ends, are provided with desired profilings which are rounded portions in the illustrated embodiment.

Figure 10:
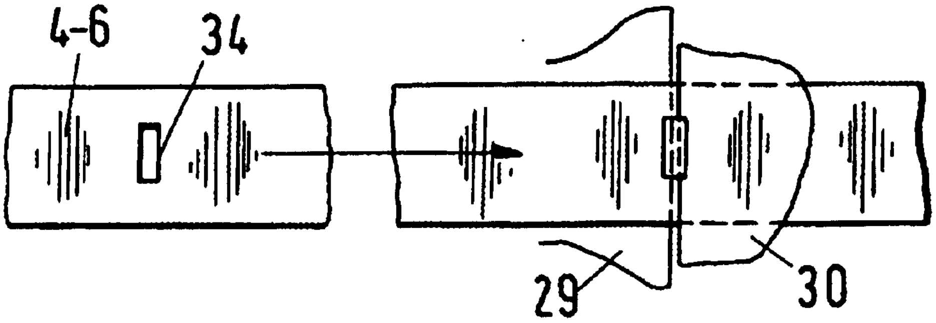
FIG. 10 shows in an illustration corresponding to FIG. 9 a further possibility of separating laminations from the sheet metal strip.

FIG. 10 shows a possibility of first stamping, for example, a rectangular opening 34, into the respective sheet metal strip 4 to 6 and of subsequently cutting with the die 30 the sheet metal strip in the longitudinal direction of this opening 34. Accordingly, the laminations 2 are provided at their narrow sides with cutouts which in the joined solid core 3 provide a depression at the two end faces. The welding seam according to the embodiment of FIG. 5*d* can be applied in these depressions. Accordingly, the welding seam does not enlarge the size at the end faces so that, for example, magnets can be fastened without problems on the end faces of the solid core 3.

With the described method, the laminations 2 can be separated from the sheet metal web 1 without any waste being produced. The laminations 2 are stacked to form the solid core 3. For interlocking and/or deburring and/or subsequent stamping, the joining tool 11 is advantageously used. For combining the laminations 2 by interlocking, joining, riveting, welding, or crimping, corresponding mounting tools are provided. The laminations 2 are advantageously combined by the manufacturer of the laminations 2 to the solid cores 3 in the described way and are optionally deburred and/or compressed by the joining tool 11. However, it is also possible to deliver the laminations 2 to the customer who will then combine the laminations to the solid core 3.

While specific embodiments of the invention have been shown and described in detail to illustrate the inventive principles, it will be understood that the invention may be embodied otherwise without departing from such principles.

What is claimed is:

1. A method for manufacturing a solid core of laminations, the method comprising the steps of:

cutting a sheet metal web in a longitudinal direction of the sheet metal web to produce at least two sheet metal strips of a width matching a width of laminations to be produced from the sheet metal strips to eliminate sheet metal waste of the sheet metal web;

separating the sheet metal strips in a direction transverse to the longitudinal direction of the sheet metal strips to form laminations;

joining the laminations to form a solid core;

deburring the laminations after the step of joining:

wherein the step of joining comprises the step of providing a joining tool with tool parts to connect the laminations, wherein, in the step of deburring, the tool parts of the joining tool are moved toward the laminations such that the burrs are pressed away by plastic deformation.

2. The method according to claim 1, wherein in the step of cutting the sheet metal strips are cut to different widths.

3. The method according to claim 1, further comprising the step of providing the sheet metal strips with positive-locking elements before the step of separating.

4. The method according to claim 3, wherein the positive-locking elements are wart-shaped projections.

5. The method according to claim 1, wherein the step of joining comprises the step of interlocking the laminations to form the solid core.

6. The method according to claim 1, wherein the step of joining comprises the steps of providing a tubular receptacle and inserting the laminations into the tubular receptacle to form the solid core.

7. The method according to claim 1, wherein the step of joining comprises the step of riveting the laminations to form the solid core.

8. The method according to claim 1, wherein the step of joining comprises the step of welding the laminations to form the solid core.

9. The method according to claim 1, wherein the step of joining comprises the step of wrapping the laminations to form the solid core.

10. The method according to claim 1, wherein the step of joining comprises the step of gluing the laminations to form the solid core.

11. The method according to claim 1, wherein the step of joining comprises the step of moving the tool parts toward the laminations.

12. The method according to claim 1, wherein the step of joining comprises the step of providing a joining tool to connect the laminations.

13. The method according to claim 11, wherein the step of joining comprises the step of moving the tool parts independently from one another toward the laminations.

* * * * *